United States Patent
Yamasaki et al.

(10) Patent No.: US 9,266,972 B2
(45) Date of Patent: Feb. 23, 2016

(54) POLYROTAXANE COMPOSITION

(75) Inventors: Tomoaki Yamasaki, Hyogo (JP); Shinya Okazaki, Hyogo (JP); Hiroki Okazaki, Hyogo (JP); Shigeki Hamamoto, Hyogo (JP); Changming Zhao, Chiba (JP); Minoru Iwata, Chiba (JP); Yuki Hayashi, Chiba (JP)

(73) Assignees: SUMITOMO SEIKA CHEMICALS CO., LTD., Hyogo (JP); ADVANCED SOFTMATERIALS INC., Chiba (JP)

( * ) Notice: Subject to any disclaimer, the term of this patent is extended or adjusted under 35 U.S.C. 154(b) by 27 days.

(21) Appl. No.: 14/004,855

(22) PCT Filed: Dec. 5, 2011

(86) PCT No.: PCT/JP2011/078024
§ 371 (c)(1),
(2), (4) Date: Nov. 13, 2013

(87) PCT Pub. No.: WO2012/124219
PCT Pub. Date: Sep. 20, 2012

(65) Prior Publication Data
US 2014/0058078 A1   Feb. 27, 2014

(30) Foreign Application Priority Data

Mar. 14, 2011 (JP) ................ 2011-055503
Mar. 14, 2011 (JP) ................ 2011-055504
Oct. 31, 2011 (JP) ................ 2011-239399

(51) Int. Cl.
C08L 5/16 (2006.01)
C08L 71/02 (2006.01)
C08K 5/053 (2006.01)
C08G 65/06 (2006.01)
C08B 37/16 (2006.01)
C08G 83/00 (2006.01)

(52) U.S. Cl.
CPC ............ *C08B 37/0015* (2013.01); *C08G 65/06* (2013.01); *C08G 83/007* (2013.01); *C08L 5/16* (2013.01); *C08L 71/02* (2013.01)

(58) Field of Classification Search
None
See application file for complete search history.

(56) References Cited

U.S. PATENT DOCUMENTS

| 5,855,900 | A | * | 1/1999 | Nobuhiko | 424/425 |
| 6,037,387 | A | * | 3/2000 | Yui et al. | 523/112 |
| 6,100,329 | A | * | 8/2000 | Gibson et al. | 525/55 |
| 6,828,378 | B2 | * | 12/2004 | Okumura et al. | 525/55 |
| 2001/0033868 | A1 | * | 10/2001 | Rossling et al. | 424/497 |
| 2005/0101624 | A1 | * | 5/2005 | Betts et al. | 514/291 |
| 2005/0123614 | A1 | * | 6/2005 | Kim et al. | 424/489 |
| 2006/0069168 | A1 | * | 3/2006 | Tabata et al. | 514/772.1 |
| 2006/0292570 | A1 | * | 12/2006 | Keinan | 435/6 |
| 2007/0111251 | A1 | * | 5/2007 | Rosania et al. | 435/7.1 |
| 2009/0149579 | A1 | | 6/2009 | Ito et al. | |
| 2009/0297464 | A1 | | 12/2009 | Jegou | |
| 2010/0274002 | A1 | * | 10/2010 | Amann et al. | 536/103 |
| 2013/0331562 | A1 | * | 12/2013 | Yamasaki et al. | 536/46 |

FOREIGN PATENT DOCUMENTS

| CN | 101300302 | 11/2008 |
| EP | 2123681 | 11/2009 |
| EP | 2287206 | 2/2011 |
| JP | 2005-154675 | 6/2005 |
| JP | 2007-092024 | 4/2007 |
| JP | 2007092024 A | * 4/2007 |

OTHER PUBLICATIONS

Araki et al., "Recent advances in the preparation of cyclodextrin-based polyrotaxanes and their applications to soft materials", Soft Matter, Aug. 8, 2007, pp. 1456-1473.

Araki et al., "New Solvent for Polyrotaxane. III. Dissolution of a Poly(ethylene glycol)/Cyclodextrin Polyrotaxane in a Calcium Thiocyanate Aqueous Solution or *N*-Methylmorpholine-*N*-Oxide Monohydrate", Journal of Applied Polymer Science, vol. 105, No. 4, Jan. 1, 2007, pp. 2265-2270.

Araki et al., "New Solvent for Polyrotaxane. III. Dissolution of a Poly(ethylene glycol)/Cyclodextrin Polyrotaxane in a Calcium Thiocyanate Aqueous Solution or *N*-Methylmorpholine-*N*-Oxide Monohydrate", Journal of Applied Polymer Science, vol. 105, No. 4, Jan. 1, 2007, pp. 2265-2270.

Skerget, et al., "Phenols, proanthocyanidins, flavones and flavonols in some plant materials and their antioxidant activities", Food Chemistry, vol. 89, No. 2, 2005, pp. 191-198.

Frankel, et al., "Antioxidant Activity of a Rosemary Extract and its Constituents, Carnosic Acid, Carnosol, and Rosmarinic Acid, in Bulk Oil and Oil-in-Water Emulsion" Journal of Agricultural and Food Chemistry, vol. 44, No. 1, Jan. 1996, pp. 131-135.

\* cited by examiner

*Primary Examiner* — Peter A Salamon
(74) *Attorney, Agent, or Firm* — Hamre, Schumann, Mueller & Larson, P.C.

(57) ABSTRACT

The present invention aims to provide a polyrotaxane composition having excellent storage stability. The present invention relates to a polyrotaxane composition comprising: a polyrotaxane containing a cyclodextrin, a polyethylene glycol which is included in the cavities of the cyclodextrin molecules in a skewered manner, and a capping group that is placed at each end of the polyethylene glycol and prevents dissociation of the cyclodextrin molecules from the polyethylene glycol; and a polyphenol antioxidant.

4 Claims, No Drawings

POLYROTAXANE COMPOSITION

TECHNICAL FIELD

The present invention relates to a polyrotaxane composition.

BACKGROUND ART

"Slide-ring gels", new gels different from physical gels and chemical gels, have been developed in recent years. A compound that is used for such slide-ring gels and is drawing attention is a crosslinked polyrotaxane.

Crosslinked polyrotaxanes are produced by crosslinking polyrotaxanes in which a capping group is introduced at each end of a pseudopolyrotaxane. In the case that a pseudopolyrotaxane is formed from a polyethylene glycol (hereinafter, also referred to as a "PEG") having a reactive group at each end and a cyclodextrin that includes the PEG, for example, the resulting crosslinked polyrotaxane has a structure in which linear molecules of the PEG are threaded through cyclodextrin molecules in a skewered manner and the cyclodextrin molecules are movable along the linear molecules (has a pulley effect). The pulley effect allows the crosslinked polyrotaxane to uniformly distribute tensile force applied thereto. The crosslinked polyrotaxane is therefore not likely to have cracks or flaws, i.e., has excellent characteristics that conventional crosslinked polymers do not have.

Polyrotaxanes used for production of a crosslinked polyrotaxane typically contain isolated cyclodextrin molecules (hereinafter also referred to as "free cyclodextrin molecules"). These free cyclodextrin molecules deteriorate the characteristics of a crosslinked polyrotaxane. Hence, polyrotaxanes need to be purified by a method such as reprecipitation such that free cyclodextrin molecules are removed.

Patent Literature 1 describes a method for producing a polyrotaxane which includes mixing a carboxylated polyethylene glycol and a cyclodextrin molecules to obtain a pseudopolyrotaxane with a carboxylated polyethylene glycol included in the cavities of the cyclodextrin molecules in a skewered manner, and capping each end of the pseudopolyrotaxane with a capping group.

In the production method described in Patent Literature 1, the obtained polyrotaxane is purified by washing the polyrotaxane with a dimethylformamide/methanol mixed solvent, dissolving the polyrotaxane in dimethyl sulfoxide, dropping the resulting solution in water to precipitate the polyrotaxane, and separating the solid and liquid phases by centrifugation, whereby free cyclodextrin molecules which deteriorate the characteristics of a crosslinked polyrotaxane are removed.

CITATION LIST

Patent Literature

Patent Literature 1: JP 2005-154675 A (Japanese Kokai Publication No 2005-154675)

SUMMARY OF INVENTION

Technical Problem

Such a purified polyrotaxane from which free cyclodextrin molecules are removed is suitable for a raw material of a crosslinked polyrotaxane right after the production. The polyrotaxane, however, may be decomposed with time during storage to release cyclodextrin molecules.

A polyrotaxane which has released cyclodextrin molecules during storage deteriorates the characteristics of a crosslinked polyrotaxane when used as a raw material of the crosslinked polyrotaxane, even if free cyclodextrin molecules are removed in production of the polyrotaxane. The polyrotaxane therefore may need to be purified again before it is used as a raw material of a crosslinked polyrotaxane to effectively achieve the characteristics of a crosslinked polyrotaxane, which complicates the production process.

Accordingly, a polyrotaxane having excellent storage stability where isolation of cyclodextrin molecules is prevented has been desired.

The present invention aims to provide a polyrotaxane composition having excellent storage stability to solve the above problem.

Solution to Problem

The present invention relates to a polyrotaxane composition comprising: a polyrotaxane containing a cyclodextrin, a polyethylene glycol which is included in the cavities of the cyclodextrin molecules in a skewered manner, and a capping group that is placed at each end of the polyethylene glycol and prevents dissociation of the cyclodextrin molecules from the polyethylene glycol; and a polyphenol antioxidant.

The present invention is described in detail below.

The present inventors have found that adding a polyphenol antioxidant to a polyrotaxane enables production of a polyrotaxane composition having excellent storage stability where isolation of cyclodextrin molecules is less likely to occur during storage. Thereby, the present invention has been completed.

The polyrotaxane composition of the present invention includes a polyrotaxane containing a cyclodextrin, a polyethylene glycol which is included in the cavities of the cyclodextrin molecules in a skewered manner, and a capping group that is placed at each end of the polyethylene glycol and prevents dissociation of the cyclodextrin molecules from the polyethylene glycol.

A polyrotaxane is typically obtainable by mixing a cyclodextrin and a PEG to produce a pseudopolyrotaxane which has the PEG included in the cavities of the cyclodextrin molecules in a skewered manner, and placing a capping group at each end of the pseudopolyrotaxane to prevent dissociation of the skewered cyclodextrin molecules.

The PEG in the polyrotaxane composition of the present invention preferably has a weight average molecular weight of 1,000 to 500,000, more preferably 10,000 to 300,000, and still more preferably 10,000 to 100,000. A weight average molecular weight of the PEG of less than 1,000 may result in poor characteristics of a crosslinked polyrotaxane. A weight average molecular weight of the PEG of more than 500,000 may decrease the storage stability of the polyrotaxane.

The weight average molecular weight herein is a PEG equivalent value calculated through measurement by gel permeation chromatography (GPC). A column used for determination of a PEG-equivalent weight average molecular weight by GPC is, for example, TSKgel SuperAWM-H (product of TOSOH CORPORATION).

The PEG preferably has a reactive group at each end. A reactive group can be introduced at each end of the PEG by a conventionally known method.

The reactive group introduced at each end of the PEG can be appropriately changed depending on the capping group to be used. Examples of the reactive group include, but not particularly limited to, hydroxy groups, amino groups, carboxyl groups, and thiol groups. Particularly, carboxyl groups are preferred. Examples of the method for introducing a carboxyl group at each end of the PEG include a method which oxidizes each end of the PEG using TEMPO (2,2,6,6-tetramethyl-1-piperidinyloxy radicals) and sodium hypochlorite.

Examples of the cyclodextrin include α-cyclodextrin, β-cyclodextrin, γ-cyclodextrin, and derivatives of these cyclodextrins. Among these, at least one selected from the group consisting of α-cyclodextrin, β-cyclodextrin, and γ-cyclodextrin is preferred, and α-cyclodextrin is more preferred in terms of the inclusion property. These cyclodextrins may be used alone or in combination.

The inclusion ratio of the polyrotaxane is preferably 6 to 60%, although it depends on the use and purpose of the polyrotaxane. An inclusion ratio of the polyrotaxane of lower than 6% may not give a sufficient pulley effect to the resulting crosslinked polyrotaxane. An inclusion ratio of the polyrotaxane of higher than 60% may result in too dense arrangement of cyclodextrin molecules, which are cyclic molecules, so that the mobility of the cyclodextrin molecules decreases. In order to give appropriate mobility to the cyclodextrin molecules and give a favorable pulley effect to the resulting crosslinked polyrotaxane, the inclusion ratio of the polyrotaxane is more preferably 15 to 40%, and still more preferably 20 to 30%.

The "inclusion ratio" herein refers to a ratio of the inclusion amount of cyclodextrin molecules including a PEG to the maximum inclusion amount of cyclodextrin molecules for the PEG. The inclusion ratio is optionally controllable by changing the mixing ratio of the PEG to the cyclodextrin or the kind of aqueous medium. The maximum inclusion amount refers to the number of cyclodextrin molecules in the case of the close-packed inclusion state in which one cyclodextrin molecule includes two repeating units of the PEG.

The inclusion ratio of the polyrotaxane can be measured by $^1$H-NMR. Specifically, the inclusion ratio can be calculated by dissolving a polyrotaxane in DMSO-$d_6$, subjecting the solution to measurement using an NMR measuring device (product of Varian Technologies Japan Ltd., "VARIAN Mercury-400BB"), and comparing the integrated value of cyclodextrin at 4 to 6 ppm and the integrated value of cyclodextrin and PEG at 3 to 4 ppm.

Examples of the polyphenol antioxidant in the polyrotaxane composition of the present invention include catechin, epicatechin, gallocatechin, catechin gallate, epicatechin gallate, gallocatechin gallate, epigallocatechin gallate, epigallocatechin, tannic acid, gallotannin, ellagitannin, caffeic acid, dihydrocaffeic acid, chlorogenic acid, isochlorogenic acid, gentisic acid, homogentisic acid, gallic acid, ellagic acid, rosmarinic acid, rutin, quercetin, quercetagin, quercetagetin, gossypetin, anthocyanin, leucoanthocyanin, proanthocyanidin, and enocyanin. For further stabilization of a long-term storage stability, more preferred among these is at least one selected from the group consisting of rosmarinic acid, gallic acid, catechin, epicatechin, epigallocatechin, epicatechin gallate, and epigallocatechin gallate.

These polyphenol antioxidants may be used alone or in combination.

Also, the polyphenol antioxidant is a natural compound widely contained in plants, and thus has a preferred characteristic that it is highly safe for human bodies. Hence, the polyrotaxane composition of the present invention, containing a polyphenol antioxidant as an antioxidant, not only has high storage stability but also enables the resulting crosslinked polyrotaxane to be used as a material having excellent quality stability and safety in uses such as cosmetics and biomaterials which directly affect human bodies. The polyphenol antioxidant also has an excellent antibacterial effect, and thus is expected to have an antibacterial effect on a final product to which the crosslinked polyrotaxane is applied.

The polyrotaxane composition of the present invention contains the polyphenol antioxidant in an amount of 0.001 to 5% by weight, more preferably 0.005 to 2% by weight, and still more preferably 0.01 to 1% by weight, based on the polyrotaxane. An amount of the polyphenol antioxidant of less than 0.001% by weight may not improve the storage stability. An amount of the polyphenol antioxidant of more than 5% by weight may not achieve any better effect of increasing the amount, which is not economical.

The method for preparing a polyrotaxane composition of the present invention is not particularly limited. Still, since a polyrotaxane and a polyphenol antioxidant need to be uniformly mixed in production of a dry, solid polyrotaxane composition, a method is preferred which includes putting a polyrotaxane and a polyphenol antioxidant into a solvent, mixing them with stirring to prepare a mixture containing the polyrotaxane, the polyphenol antioxidant, and the solvent, and drying the mixture, for producing a polyrotaxane composition having excellent storage stability. For producing a polyrotaxane composition having even better storage stability, a method is more preferred which includes drying a mixture in which at least one of a polyrotaxane and a polyphenol antioxidant is dissolved in the solvent.

In preparation of a mixture containing a polyrotaxane, a polyphenol antioxidant, and a solvent, if cyclodextrin molecules including a PEG are not modified by groups such as modifying groups, a solvent which can be used for dissolving at least the polyrotaxane is, for example, DMSO or an alkaline aqueous solution.

In preparation of a mixture containing a polyrotaxane, a polyphenol antioxidant, and a solvent, if the polyphenol antioxidant is not dissolved in the solvent, mixing these in the form of fine particles before the preparation of the mixture allows production of a polyrotaxane composition having better storage stability. The method for making the polyphenol antioxidant into fine particles may be a known method such as mechanical grinding using a grinder (e.g. ball mill, pin mill), or particle size reduction through crystallization.

In the case of making the polyphenol antioxidant into fine particles, the volume-average particle size of the polyphenol antioxidant is preferably 0.01 to 100 µm, more preferably 0.1 to 30 µm, and still more preferably 0.1 to 10 µm. A volume-average particle size of the polyphenol antioxidant of smaller than 0.01 µm may not allow the polyphenol antioxidant to be easily treated by grinding or crystallization, and may not improve the storage stability either. A volume-average particle size of the polyphenol antioxidant of greater than 100 µm may not allow the polyphenol antioxidant to be uniformly dispersed in the resulting polyrotaxane composition, which may decrease the effect of improving the storage stability.

The volume-average particle size of the polyphenol antioxidant can be measured by a laser diffraction particle size analyzer.

Examples of the method for drying the mixture containing a polyrotaxane, a polyphenol antioxidant, and a solvent may be a known method such as reduced-pressure drying and freeze drying.

The drying temperature in the above drying may vary depending on the conditions such as the dryer to be used. In the case of using a shelf reduced-pressure dryer, the drying temperature is preferably 20 to 100° C., more preferably 40 to 90° C., and still more preferably 40 to 80° C., in terms of suppressing generation of radicals which induce decomposition of polyrotaxanes. A drying temperature of lower than 20°

C. may lead to insufficient drying. A drying temperature of higher than 100° C. may decompose the polyrotaxane to decrease the inclusion ratio.

In the drying, the pressure in the dryer system is not particularly limited, but is typically a pressure near an atmospheric pressure. Vacuum drying is also possible, and drying under a pressure not higher than an atmospheric pressure is preferred.

Advantageous Effects of Invention

The present invention enables production of a polyrotaxane composition having excellent storage stability.

DESCRIPTION OF EMBODIMENTS

The present invention is described below in more detail based on examples which, however, are not intended to limit the scope of the present invention. In the following, a PEG having a carboxyl group at each end was produced by oxidation of a PEG in accordance with the method described in WO 05/052026 A.

EXAMPLE 1

(1) Preparation of PEG Having Carboxyl Group at Each End by TEMPO Oxidation of PEG A 20-L reaction vessel was charged with 10 L of water, and 1 kg of a PEG (molecular weight: 35,000), 10 g of TEMPO (2,2,6,6-tetramethyl-1-piperidinyloxy radicals), and 100 g of sodium bromide were dissolved. To the solution was added 500 mL of a commercially available aqueous solution of sodium hypochlorite (effective chlorine concentration: 5% by weight), and the resulting mixture was stirred at room temperature for 30 minutes. An amount of 500 mL of ethanol was added to decompose an excess of the sodium hypochlorite to terminate the reaction. Liquid separation extraction using 5 L of methylene chloride was performed three times to extract components other than the mineral salt. The methylene chloride was removed by vacuum distillation. Thereby, a PEG (1 kg) having a carboxyl group at each end was obtained.

(2) Preparation of Aqueous Dispersion of Pseudopolyrotaxane from α-Cyclodextrin and PEG Having Carboxyl Group at Each End The prepared 1 kg of the PEG having a carboxyl group at each end was mixed with 35 L of water, and further with 4 kg of α-cyclodextrin. The resulting mixture was heated to 70° C. for dissolution. The solution was cooled to 4° C. with stirring, thereby a milky aqueous dispersion of a pseudopolyrotaxane was precipitated.

(3) Drying of Aqueous Dispersion of Pseudopolyrotaxane

The prepared dispersion of a pseudopolyrotaxane in an amount of 40 kg was dried by a spray dryer, so that a powdery dry product in an amount of 4.7 kg was produced. The inlet temperature of the dryer was 165° C., and the outlet temperature was 90° C.

(4) Capping of Pseudopolyrotaxane Using Adamantanamine and BOP Reagent Reaction System In a 50-L flask, 45 g of adamantanamine was dissolved in 17 L of dimethyl formamide (DMF) at room temperature. Then, the obtained pseudopolyrotaxane in an amount of 4.7 kg was added to the flask, and the flask was promptly shaken well.

Subsequently, a solution of 130 g of a BOP reagent (benzotriazol-1-yl-oxy-tris (dimethylamino)phosphonium hexafluorophosphate) in 8 L of DMF was added to the flask, and the flask was promptly shaken well.

Furthermore, to the flask was added a solution of 50 mL of diisopropylethylamine in 8 L of DMF, and the obtained mixture was stirred overnight at normal temperature.

The obtained mixture was filtered. The resulting residue was mixed with 30 kg of water. The mixture was heated to 70° C. with stirring, stirred for 60 minutes at the same temperature, and filtered again.

(5) Preparation of Polyrotaxane Composition

The obtained residue was well mixed with a 0.1% by weight aqueous solution of rosmarinic acid (rosemary extract, product of Mitsubishi-Kagaku Foods Corporation, "RM-21A base") in an amount of 300 g (0.01% by weight of rosmarinic acid, based on the polyrotaxane) as a polyphenol antioxidant, so that a mixture containing a polyrotaxane, rosmarinic acid, and water was obtained. The obtained mixture was vacuum-dried for 16 hours at 60° C. using a vacuum dryer, whereby 3 kg of a polyrotaxane composition was obtained. The free cyclodextrin content in the obtained polyrotaxane composition was measured using a high-performance liquid chromatograph (product of Waters, "Alliance 2695"), which showed a result of 8% by weight.

EXAMPLE 2

An amount of 3 kg of a polyrotaxane composition was obtained in the same manner as in Example 1, except that in "(5) Preparation of polyrotaxane composition", the concentration of the aqueous solution of rosmarinic acid was set to 0.5% by weight (0.05% by weight of rosmarinic acid, based on the polyrotaxane). The measurement was performed in the same manner as in Example 1, which showed that the obtained polyrotaxane composition had a free cyclodextrin content of 8% by weight.

EXAMPLE 3

An amount of 3 kg of a polyrotaxane composition was obtained in the same manner as in Example 1, except that in "(5) Preparation of polyrotaxane composition", a 1% by weight aqueous solution of gallic acid in an amount of 300 g (0.1% by weight of gallic acid, based on the polyrotaxane) was added as a polyphenol antioxidant in place of the 300 g of the 0.1% by weight aqueous solution of rosmarinic acid. The measurement was performed in the same manner as in Example 1, which showed that the obtained polyrotaxane composition had a free cyclodextrin content of 8% by weight.

EXAMPLE 4

An amount of 3 kg of a polyrotaxane composition was obtained in the same manner as in Example 1, except that in "(5) Preparation of polyrotaxane composition", a 1% by weight aqueous solution of a tea extract with a catechin content of 5% (product of JAPAN CHLOROPHYLL Co., Ltd., "CATEKING S") in an amount of 300 g (0.005% by weight of catechin, based on the polyrotaxane) was used as a polyphenol antioxidant in place of the 300 g of the 0.1% by weight aqueous solution of rosmarinic acid. The measurement was performed in the same manner as in Example 1, which showed that the obtained polyrotaxane composition had a free cyclodextrin content of 8% by weight.

COMPARATIVE EXAMPLE 1

A polyrotaxane was obtained in the same manner as in Example 1, except that the 0.1% by weight aqueous solution of rosmarinic acid was not used in "(5) Preparation of polyrotaxane composition". The measurement was performed in the same manner as in Example 1, which showed that the obtained polyrotaxane had a free cyclodextrin content of 8% by weight.

<Evaluation>

The polyrotaxane compositions obtained in the examples and the polyrotaxane obtained in the comparative example were stored in a 40° C. thermostatic bath. The free cyclodextrin content of each of these products was measured on the 30th and 120th days using a high-performance liquid chromatograph (product of Waters, "Alliance 2695"). The results are shown in Table 1 together with the values immediately after the production.

TABLE 1

| | Polyphenol antioxidant | | Free cyclodextrin content (% by weight) | | |
|---|---|---|---|---|---|
| | Kind | Amount (% by weight) | Day 0 | Day 30 | Day 120 |
| Example 1 | Rosmarinic acid | 0.01 | 8 | 8 | 9 |
| Example 2 | Rosmarinic acid | 0.05 | 8 | 8 | 8 |
| Example 3 | Gallic acid | 0.1 | 8 | 8 | 9 |
| Example 4 | Catechin | 0.005 | 8 | 9 | 9 |
| Comparative Example 1 | — | — | 8 | 10 | 15 |

INDUSTRIAL APPLICABILITY

The present invention can provide a polyrotaxane composition having excellent storage stability.

The invention claimed is:

1. A polyrotaxane composition comprising:
   polyrotaxane containing cyclodextrin, polyethylene glycol, which is included in cavities of molecules of the cyclodextrin in a skewered manner, and a capping group, which is placed at each end of the polyethylene glycol and prevents dissociation of the molecules of the cyclodextrin from the polyethylene glycol; and
   a polyphenol antioxidant in an amount range from 0.01 to 1% by weight relative to the polyrotaxane, wherein the polyphenol antioxidant is rosmarinic acid.

2. The polyrotaxane composition according to claim 1, wherein the polyethylene glycol has a weight average molecular weight in a range from 1,000 to 500,000.

3. The polyrotaxane composition according to claim 1, wherein the cyclodextrin is at least one material selected from the group consisting of α-cyclodextrin, β-cyclodextrin, and γ-cyclodextrin.

4. The polyrotaxane composition according to claim 1, which comprises the polyrotaxane at an inclusion ratio in a range from 6 to 60%.

* * * * *